Figure 4:
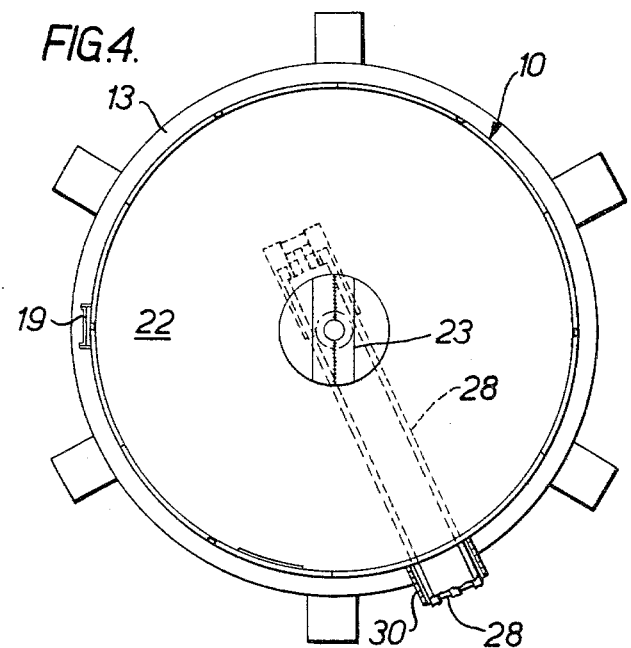

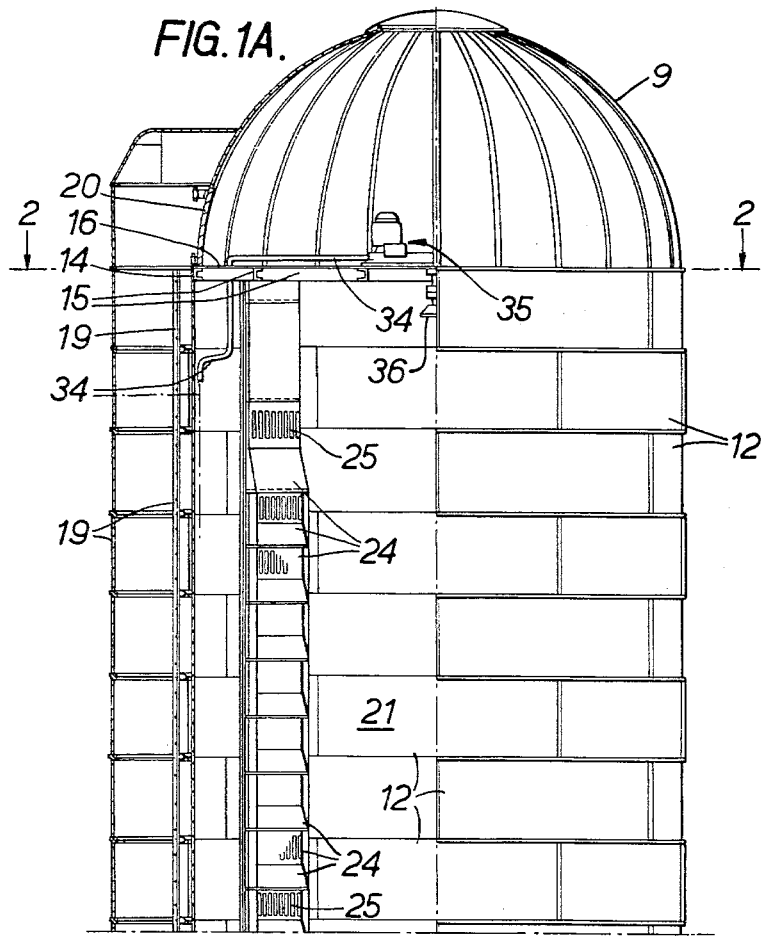

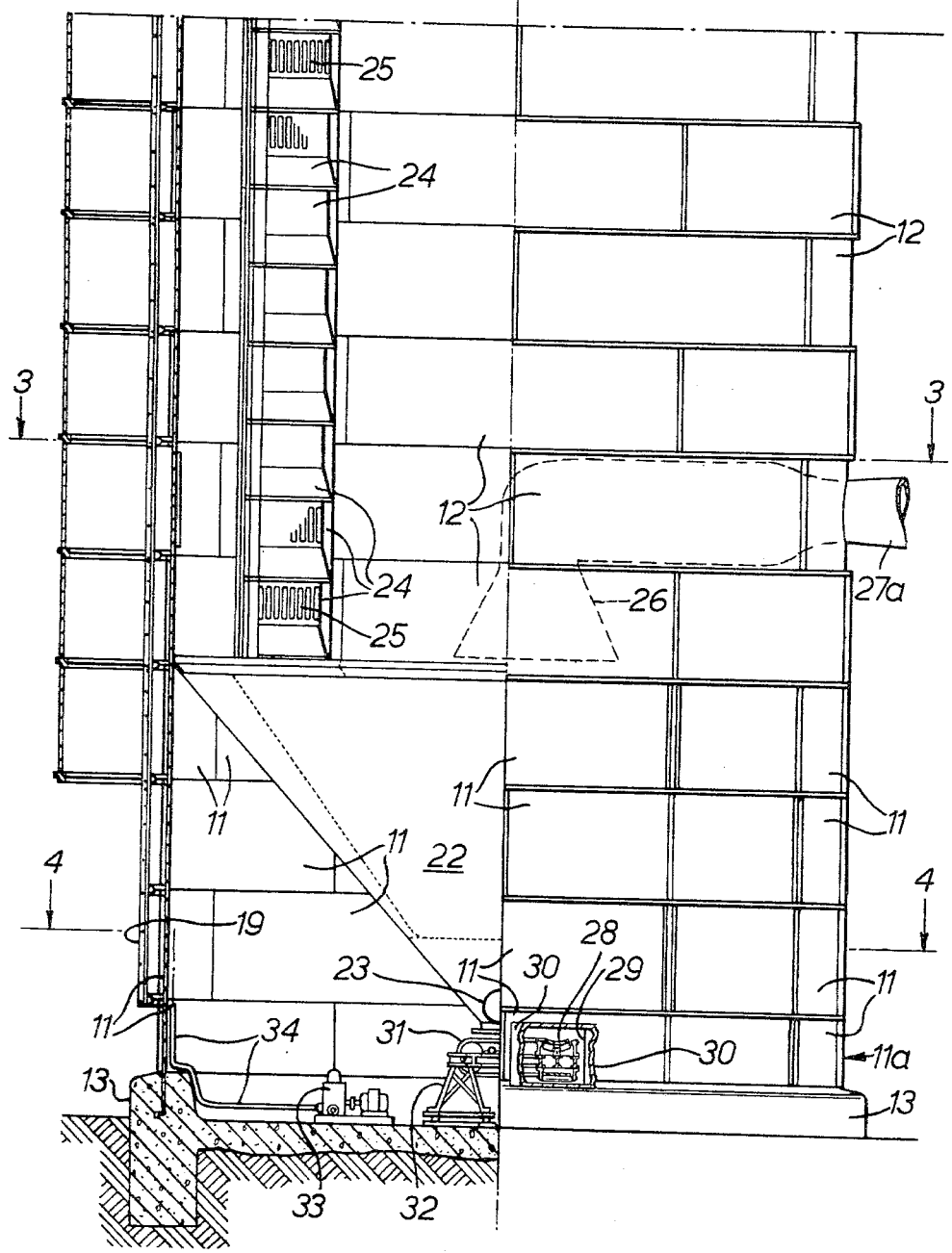

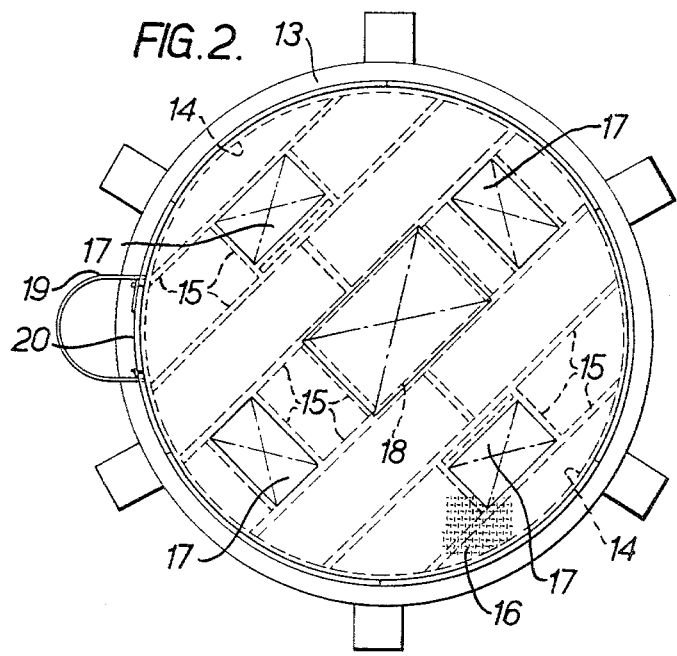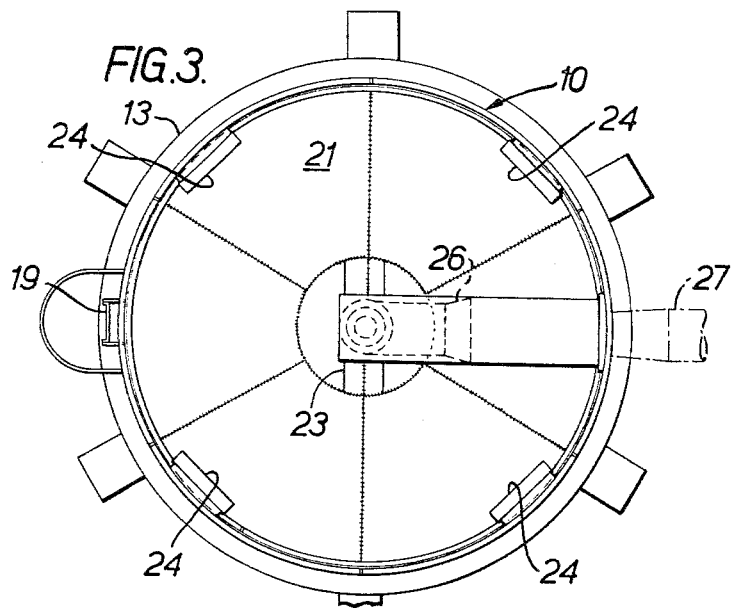

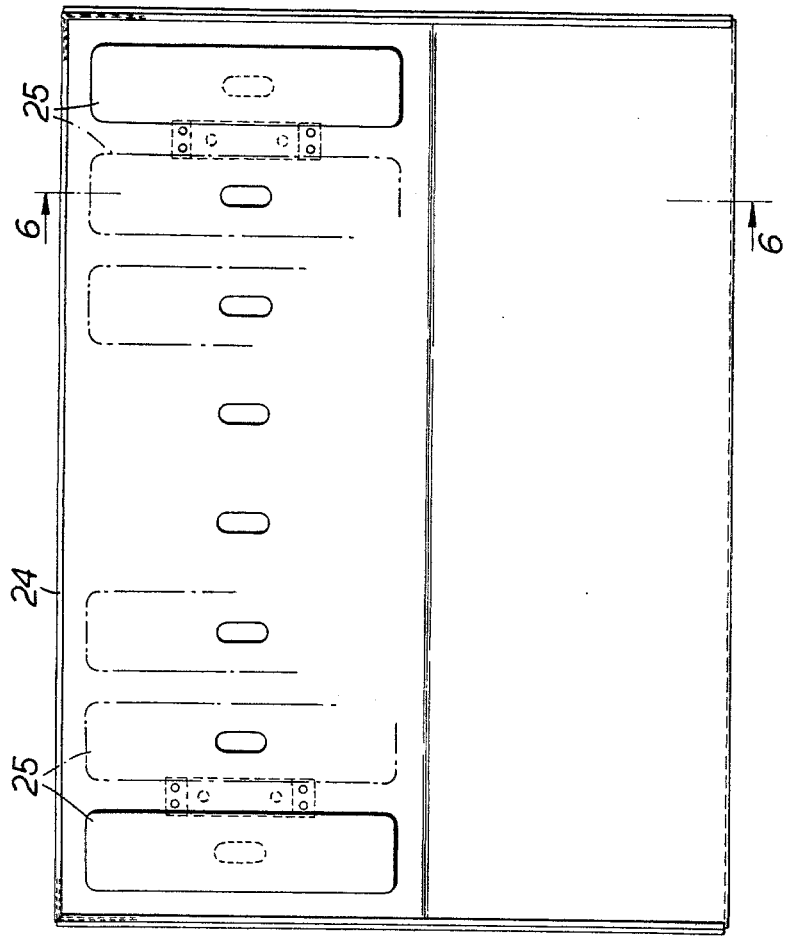

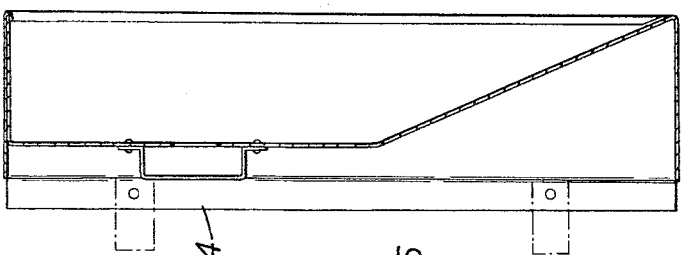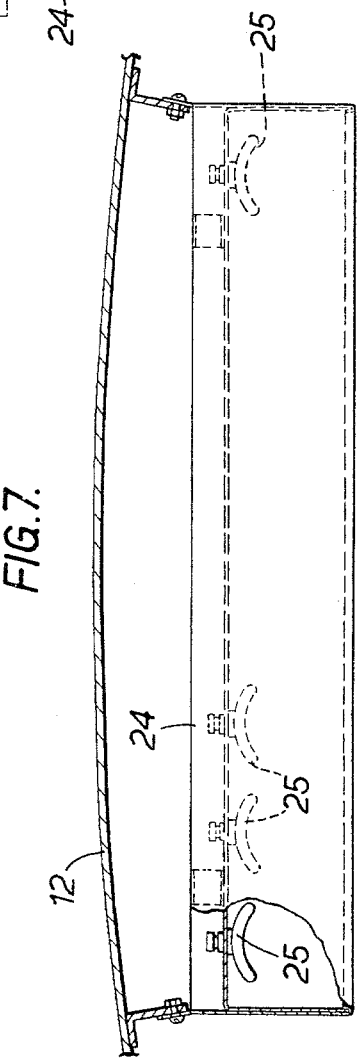

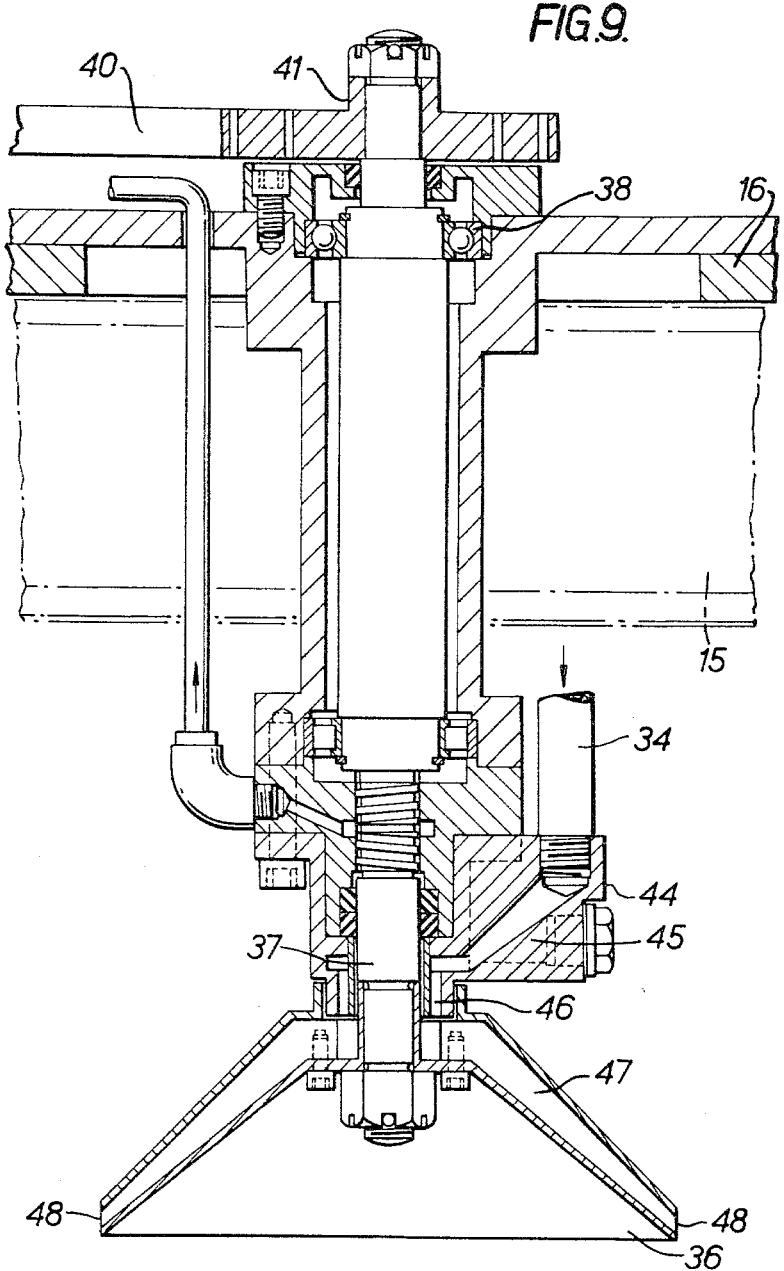

United States Patent Office 3,236,285
Patented Feb. 22, 1966

3,236,285
SPRAY DRYING OF LIQUIDS
Antony J. Mee, Fordingbridge, and Thomas Abel Smith, Hertford, England, assignors to Micro-Biologicals Limited, Hertford, England, a British company
Filed June 24, 1963, Ser. No. 289,993
Claims priority, application Great Britain, July 6, 1962, 25,961/62
5 Claims. (Cl. 159—4)

This invention relates to the drying of liquid solutions, suspensions or emulsions for producing granular or particulate materials and has for an object to provide an efficient method and simple apparatus which will, for example, enable materials originally in liquid form to be converted to powder form without detriment to their composition or desired physical characteristics.

In many cases, particularly in the chemical, foodstuffs, and animal feeding stuffs industries, materials required in powder form are initially prepared as liquids— either solutions or suspensions—the drying and comminution of which must be carefully controlled in order to preserve the dietetic, prophylactic, medicinal or other value of the product. For this purpose driers are known in which liquid is fed to a rotary disc in the top of a chamber through which hot air is circulated, usually at temperatures up to 180° C., the disc when spinning serving to form individual droplets which then fall through the hot air and become dried, and are collected at the base of the chamber as a powder. Some droplets, however, adhere to the chamber wall and are destroyed or damaged by over-exposure to the hot air. Also, certain biological fluids tend not to be broken into discrete particles by the spinning disc because the latter is raised by the circulating hot air to a high temperature at which the liquid begins to dry before atomisation is complete.

The present invention aims at minimising or eliminating these disadvantages by forming the liquid into droplets in a cool atmosphere, and then drying the droplets by exposing them in a drying chamber to radiant heat of such wavelength as to promote uniform evaporation of moisture throughout the mass of each droplet, and for a sufficient time to evaporate all, or a predetermined proportion, of their moisture content. The dried product is collected and removed.

Preferably, the droplets are allowed to fall freely under gravity through the drying chamber, and moisture-laden atmosphere is conveniently simultaneously removed from the chamber. This latter operation must be carried out in such a way that the falling droplets are not significantly accelerated, or deflected by random air currents.

Advantageously the droplets are formed by means of a rotary disc or a nozzle type of atomising spray fed with a liquid starting material in a conventional manner. Cool air, if required, can be induced in the region of this disc or nozzle to prevent it from overheating.

The droplets may be dried by radiation from radiant heaters mounted around the internal wall of the chamber, or axially thereof, or both, and are collected below the heaters for disposal outside the apparatus.

Figure 8:
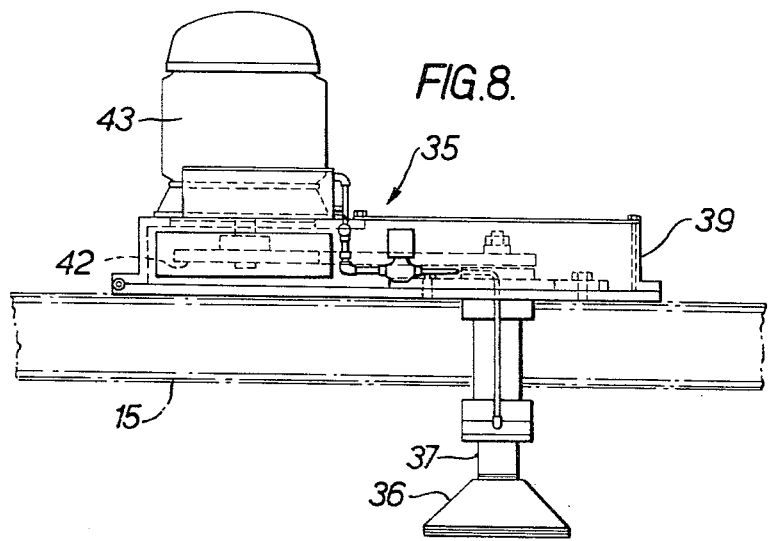

A preferred embodiment of the invention will now be particularly described with reference to the accompanying drawings in which:

FIGURES 1A and 1B are complementary half-sectional elevations of a complete drier;
FIGURE 2 is a sectional plan on the line 2—2 of FIGURE 1A;
FIGURE 3 is a sectional plan on the line 3—3 of FIGURE 1B;
FIGURE 4 is a section on the line 4—4 of FIGURE 1B;
FIGURE 5 is a front elevation of a heater housing;
FIGURE 6 is a section on the line 6—6 of FIGURE 5;
FIGURE 7 is a fragmentary view of the heater housing;
FIGURE 8 is a side view of the rotary atomising unit, and
FIGURE 9 is a sectional elevation of the spraying disc or spinner and shaft of the unit of FIGURE 8.

The drier consists of a cylindrical main framework or shell 10 (FIGURES 1A to 4) assembled in sections from mild steel panels 11 and stainless steel panels 12 to form a structure of, say 15 feet diameter. The mild steel panels 11 form the lower section of the shell, and the stainless steel panels 12 form the upper section of the shell. The bottom ring 11a of the mild steel panels 11 is embedded in an annular concrete base or foundation 13. At a height of, say, forty five feet from the base 13 a steel or aluminum ring 14 (FIGURES 1A and 2) is bolted to the shell 10 and carries steel or aluminum girders 15 to which are fixed conventional steel or aluminum tread plates 16 to form a floor. The ring 14 also carries a domed roof 9 closing the top of the shell 10. Standard air filters 17 replace certain sections of the floor 16 and a central removable plate 18 carries a known type of rotary atomiser unit 35 described below with reference to FIGURES 8 and 9. Access to the floor 16 and atomiser unit 35 is provided by an external enclosed ladder 19 and a door 20 in the side of the roof dome 9.

The stainless steel panels 12 which form the upper section of the shell 10 define a drying chamber 21, below which is mounted a conical collecting chamber 22 (FIGURES 1B and 4) supported on and enclosed by the mild steel panels 11 of the shell. The collecting chamber 21 is steep-sided, and conventional vibrators (not shown) may be attached thereto, in order to promote free flow of dried particles down its sides. It terminates at the bottom in a rotary outlet valve 23.

Four banks of heater boxes 24 are mounted in vertical lines on the inner surface of the stainless steel panels 12. Each box 24 contains eight infra-red heaters 25 which are advantageously 400-watt glazed ceramic trough elements, type FSR, manufactured by Elstein-Werk of Northeim, Hannover, Germany. The total heater loading is 200 kw., and the predominant wavelength of heat emission is 4.34$\mu$. In general, however, the wavelength of the radiated energy may vary from this figure within the accepted range understood by the term "infra-red"— preferably within the range 2.5$\mu$ to 7.5$\mu$—the predominant wavelength of the radiation being chosen so as to heat falling particles uniformly throughout their mass and avoid a local concentration of heat, and hence of drying action, on their external surfaces which tends to leave the interior only partially dried. For the removal of water, the optimum wavelength is 4.2$\mu$. In this connection, it should be noted that a residual moisture content of about 4% to 5% is acceptable in spray-dried products.

Just above the mouth of the conical collecting chamber 22 is located the intake of a proprietary cyclone unit 26 (FIGURE 1B) such as that made and sold by Keith Blackman Ltd. of London under the brand name "Tornado-Cyclogalax." This unit is supported wholly within the lower end of the drying chamber 21 and connected by an external trunk 27 to an extractor fan (not shown) which serves to withdraw moisture-laden air from the chamber 21. Any particles entrained with this air are separated in the cyclone unit 26 and returned to the mouth of the collecting chamber 22. The residual moist air is discharged to atmosphere and cool make-up air is induced through the filters 17, thereby cooling the zone around the atomiser spinner 36. The location of the cyclone unit 26 within the drying chamber 21 instead of externally thereof avoids the needs for lagging of the cyclone.

Below the outlet valve 23 in the base of the collecting chamber 22 is located a conventional belt conveyor 28 which passes through an aperture 29 in one of the mild steel panels 11 of the lowest ring 11a, and leads to a convenient discharge point at which the dried product may be packaged or stored. The conveyor 28 is totally enclosed by a shield 30, and its flexible belt is tensioned over end rolls, one of which is indicated at 31 in FIGURE 1B, supported on a girder or like framework 32 within the base 13 of the structure.

The liquid to be spray-dried is pumped from a tank or reservoir (not shown) located at some convenient point on the site by means of a conventional metering pump 33 also located in the base 13 of the shell structure (FIGURE 1B). The pump 33 delivers the liquid at a controlled rate through a pipe 34 which runs up the inside of the shell 10 and passes through the floor structure 15, 16 at the top of the drying chamber 21. Here, it delivers liquid to a spinning disc atomiser unit indicated generally at 35 in FIGURE 1A, and shown in greater details in FIGURES 8 and 9. This unit comprises a generally conical double-walled spinner 36 supported at the bottom and of a shaft 37 whose upper end is carried in a bearing 38 mounted within the base 39 of the unit 35. The base 39 encloses a driving belt 40 which passes over a pulley 41 locked on the top of the shaft 37, and over a driving pulley 42 also enclosed in the base 39 and keyed on the shaft of an electric driving motor 43. Provision may be made for varying the speed ratio of the belt drive 40, 41, 42 in conventional manner.

Above the point at which the spinner 36 is secured on the shaft 37, a fixed adaptor 44 surrounds the shaft and has an internal duct 45 whose lower end communicates with an annular funnel 46 formed integrally with the spinner and which opens into the cavity 47 between the two conical walls of the spinner 36. This cavity terminates in an annular discharge orifice 48. The liquid delivery pipe 34 is secured in the adaptor 44 to register with the upper end of the internal duct 45. This unit is of a proprietary design, and conveniently employs a motor 43 rated at 2 H.P. and having a nominal shaft speed of 2,800 r.p.m. The spinner 36 is conveniently of 6 to 9 inches diameter at the annular discharge orifice 48, and is mounted to run at shaft speeds of from 3,000 to 10,000 r.p.m. according to requirements. The liquid is delivered from the metering pump 33 through the pipe 34, duct 45, annular passage 46 and cavity 47 to the annular discharge orifice 48 around the rim of the spinner 36.

In operation, the liquid to be powdered is fed by the metering pump 33 to the rotary atomiser unit 35 and emerges from the annular orifice 48 in a cloud of fine droplets. These fall by gravity through the drying chamber 21, where they are exposed to the infra-red radiation emitted by the heaters 25. This radiation is of a wavelength which penetrates to the centre of each droplet and dries it uniformly throughout its mass. The vapor expelled from the droplets is taken up by the air within the chamber 21, and this is continuously extracted through the cyclone unit 26. The air required to make up that extracted by the unit enters the drying chamber 21 at the top through the filters 17, thus serving to maintain the atmosphere in the vicinity of the atomising spinner 36 at a temperature below that at which drying of the liquid to be atomised can commence. This prevents initial malformation of droplets at the atomiser and promotes consistency of particle size and shape in the finished product.

A drier according to the present invention is compact and relatively simple and inexpensive to construct and erect, and can be operated at relatively low cost since the efficiency of drying of the droplets is high due to the known efficiency of action of infra-red radiation. This efficiency also enables the starting up time to be reduced as compared with conventional hot air driers which operate at 150° C. to 180° C. A plant according to the invention can be operational within ten minutes of switching on the heaters 25, as opposed to a delay of over one hour which is customary for conventional driers.

Furthermore, since drying does not depend on intimate contact of the droplets with hot dry air, turbulence in the drying chamber 21 is not established and the loss sometimes experienced in conventional hot air driers due to encrustation of the internal wall by droplets is avoided. In the present system, droplets are not forced against the walls by turbulent air currents and do not become overdried and caused to adhere to the wall. Thus, loss of material and the cost of frequent shut-downs of the plant for cleaning of the internal wall is considerably reduced or even eliminated.

A further advantage of the process according to the present invention is that the droplets tend to be formed more truly spherical in shape than is the case with driers using hot air circulation. This is at least partly due to the fact that the spraying disc 36 (or nozzle) does not become heated, and hence the risk of the formation of tails on the droplets is minimised. Consequently, products dried by the process according to the present invention tend to be more free flowing, and this in turn leads to an economy of packaging.

Where the product to be dried is a foodstuff, there is a tendency for improvement of flavour as compared with the conventional hot air dried product, and this is probably at least in part due to the minimising of damage or undesirable modification of the molecular structure of the substance being dried when exposed to low-temperature infra-red radiation rather than to the much higher temperatures required in conduction and convection heating.

It has, furthermore, been found possible to dry certain products which have hitherto been difficult or impossible to dry, at least in production quantities—e.g., certain grades of glucose and corn steep liquor. This feature is probably due to the uniformity of penetration of the droplet by infra-red radiation as compared with the uneven penetration and preferential heating of the droplet surface achieved by sensible heat in a convector system.

The following examples illustrate the performance of a plant according to the present invention:

*Example I*

39 lbs. of glucose diluted with water to a 60.3% solids solution was sprayed by means of a 6″ diameter spinning disc at 7000 r.p.m. in a cylindrical chamber 15 ft. in diameter and 19 ft. high at an ambient temperature of 20° C. Moisture-laden air was extracted at the rate of 1400 cubic feet per minute and a temperature of about 40° C. Heaters 25 having a total loading of 50 k.w. were used to provide radiant heat of maximum wavelength 3.25$\mu$.

The solution wes fed through the drying chamber 21 at the rate of 10 lbs. in 6 minutes, and the dried glucose recovered was found to have a moisture content of 4.50%. This was equivalent to removing 39 lbs. of water in one hour.

*Example II*

28 lbs. of corn steep liquor containing 54.3% solids was diluted with 5 lbs. of water to give 39.3% solids in solution. It was sprayed into the drying chamber of the equipment described in Example I at a rate of 69 lbs. per hour and at an ambient temperature of 18° C. Moisture laden air was extracted at a temperature of about 40° C. The dried material was found to have a moisture content of 4.3%, which was equivalent to removing 41.88 lbs. of water in one hour.

*Example III*

14 lbs. of liquid egg, as broken out from the shell, having a solids content of 25% was sprayed into the drying chamber of the equipment described in Example I. It was fed through in 17 minutes at an ambient temperature of 10° C., the moisture-laden air being extracted at a temperature of about 22° C. the dried egg recovered had a moisture content of 4.11%. This involved the removal of the 10½ lb. water content at the rate of 37 lbs. per hour.

*Example IV*

20 kilos of an aqueous solution of polyvinyl alcohol emulsified with vitamin A Palmitate having a total solids content of 22% was sprayed into the drying chamber of the equipment described in Example I at an ambient temperature of 15° C. It was put through in 54 minutes, and moisture-laden air was extracted at about 30° C., removing 34 lbs. of water. The dried product had a moisture content of 3.86%.

The lack of sensible heat in a process according to the present invention reduces the need for lagging both of the main structure 10 and of components such as the cyclone 26 which are necessarily exposed to radiation in the chamber 21. Hence, first cost and maintenance costs can be significantly reduced in the construction, erection, and operation of a plant according to the present invention. Furthermore, due to the low operating temperature, substantially all auxiliary equipment can be located within the shell 10, and it is not necessary to house the drier in a building. It can therefore be left free-standing in the open. This reduces first cost.

Although only a vertical drying chamber 21 through which the droplets fall freely under gravity has been described and illustrated, it is to be understood that the apparatus may be inverted and the droplets carried upwards through the drying chamber 21 in a current of air or other gaseous medium. Heaters 25 may also be mounted in an axial column in the chamber 21 in addition to or in substitution for the well-mounted heaters 25 described above. The chamber 21 may be of polygonal cross-section instead of circular if desired.

Instead of banks of heater boxes 24 each containing a number of separate heaters 25, one or more elongated heaters (not shown) may be substituted in the form of an electrical heater element sheathed in a continuous stainless steel tubing. Such tubing may be wound around the inner peripheral wall of the drying chamber 21. Alternatively, a plurality of spaced rings each constituted by a sheathed heater element may be mounted around the internal wall of the drying chamber 21.

The method and apparatus according to the invention are applicable not only to aqueous solutions or suspensions but also to solutions or suspensions in alcohol or other liquids which then constitute the "moisture" to be evaporated by the radiant heat in the drying chamber 2.

We claim:

1. A spray drier for liquid solutions or suspensions of solids comprising a vertical cylindrical shell having a roof and a base; a lower cylindrical section of said shell resting on said base; an upper cylindrical section of said shell defining a drying chamber resting on said lower cylindrical section and carrying said roof; a flat floor at the top of said drying chamber below said roof; an inverted conical collecting chamber within said lower cylindrical section; infra red heater disposed around the internal wall of said upper section; an air inlet in said floor; an air extractor and cyclone separator unit mounted within and adjacent to the lower end of said drying chamber and having its intake located on the vertical axis of said drying chamber adjacent the entry to said collecting chamber; a rotary atomiser unit mounted centrally on said floor to discharge droplets of atomised liquid into the top of said drying chamber; a liquid pump in said base; a delivery pipe from said pump to said rotary atomiser unit; and conveyor means for receiving dried particles collected in said collecting chamber.

2. The method of spray drying a liquid substance containing dissolved or suspended solid comprising the steps of admitting a stream of air at substantially atmospheric temperature and pressure downwardly into a spraying region at the upstream end of and above a vertically elongated drying zone; spraying the liquid substance downwardly into and below said air admission location of said region to form droplets therein; passing the droplets and air concurrently through the elongated drying zone; subjecting the droplets in said zone to infra red radiation until the resulting particles are substantially dry and separating the particles and moisture-laden air and collecting the dried particles.

3. A spray drier for liquid substances containing dissolved or suspended solids comprising a drying chamber having an elongated heating zone intermediate its end; an inlet for air at one end of said chamber; flow producing means for causing a stream of air to flow by way of said inlet through said heating zone to the other end of said chamber and from said chamber; a liquid atomizer at said one end and a particle collector at said other end of said chamber; means for continuously supplying liquid to be dried to said atomizer; infra red heating means distributed along the length of said heating zone and adapted by radiation to effect drying of atomized droplets carried therethrough, said atomizer being located in a space beyond the end of said heating zone adjacent to said one end of said chamber and means for removing the dried product from said particle collector.

4. A spray drier as defined in claim 3 in which said flow producing means comprises an air outlet located adjacent to the junction of said chamber and said particle collector.

5. A spray drier according to claim 4 wherein said flow producing means comprises a cyclone separator located within the drying chamber in a duct leading to an extraction fan.

References Cited by the Examiner

UNITED STATES PATENTS

| | | | |
|---|---|---|---|
| 1,133,051 | 3/1915 | Merrell | 159—4 X |
| 1,301,288 | 4/1919 | MacLachlan | 159—4 |
| 1,374,555 | 3/1921 | Dick | 159—48 |
| 1,557,921 | 10/1925 | Buel. | |
| 1,853,682 | 4/1932 | Hechenbleikner. | |
| 1,958,702 | 5/1934 | Johnson et al. | |
| 2,110,167 | 3/1938 | Northcutt et al. | 159—4 |
| 2,344,754 | 3/1948 | Vang. | |
| 2,842,193 | 7/1958 | Ballestra | 159—4 |
| 2,849,430 | 8/1958 | Amos et al. | |
| 2,953,457 | 9/1960 | Sanna. | |
| 3,049,174 | 8/1962 | Marshall | 159—4 |
| 3,112,239 | 11/1963 | Andermatt. | |
| 3,113,062 | 12/1963 | Darnell | 159—4 |

FOREIGN PATENTS

| | | |
|---|---|---|
| 317,166 | 8/1929 | Great Britain. |
| 599,269 | 3/1948 | Great Britain. |
| 136,707 | 11/1961 | Russia. |

NORMAN YUDKOFF, *Primary Examiner.*

J. SOFER, *Assistant Examiner.*